(12) United States Patent
Roig et al.

(10) Patent No.: US 11,594,784 B2
(45) Date of Patent: *Feb. 28, 2023

(54) INTEGRATED FIBROUS SEPARATOR

(71) Applicant: EnPower, Inc., Indianapolis, IN (US)

(72) Inventors: Raymundo Roig, Phoenix, AZ (US); Adrian Yao, Phoenix, AZ (US)

(73) Assignee: EnPower, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,120

(22) Filed: Oct. 15, 2021

(65) Prior Publication Data

US 2023/0030128 A1  Feb. 2, 2023

Related U.S. Application Data

(60) Provisional application No. 63/226,627, filed on Jul. 28, 2021.

(51) Int. Cl.
*H01M 4/04* (2006.01)
*H01M 50/44* (2021.01)
*H01M 50/434* (2021.01)
*H01M 50/417* (2021.01)

(52) U.S. Cl.
CPC ......... *H01M 50/44* (2021.01); *H01M 4/0404* (2013.01); *H01M 4/0435* (2013.01); *H01M 50/417* (2021.01); *H01M 50/434* (2021.01)

(58) Field of Classification Search
None
See application file for complete search history.

(56) References Cited

U.S. PATENT DOCUMENTS

| | | |
|---|---|---|
| 5,824,120 A | 10/1998 | Mitchell et al. |
| 5,873,523 A | 2/1999 | Gomez et al. |
| 6,287,720 B1 | 9/2001 | Yamashita et al. |
| 7,138,208 B2 | 11/2006 | Tanjo |
| 7,348,101 B2 | 3/2008 | Gozdz et al. |
| 7,579,112 B2 | 8/2009 | Chiang et al. |
| 7,682,740 B2 | 3/2010 | Yong et al. |
| 7,745,048 B2 | 6/2010 | Hwang et al. |
| 7,781,098 B2 | 8/2010 | Chiang et al. |
| 8,062,789 B2 | 11/2011 | Kim et al. |

(Continued)

FOREIGN PATENT DOCUMENTS

| | | |
|---|---|---|
| CN | 105304848 A | 2/2016 |
| CN | 107204416 A | 9/2017 |

(Continued)

*Primary Examiner* — Tracy M Dove
(74) *Attorney, Agent, or Firm* — Kolitch Romano Dascenzo Gates LLC

(57) ABSTRACT

An electrode including an integrated fibrous separator may include an active material layer layered onto a current collector substrate, and an integrated separator layer comprising a mixture of ceramic particles and fibers layered onto the active material layer. The fibers may be oriented substantially horizontally, and may be configured to increase a lateral strength of the electrode. In some examples, the electrode includes two or more active material layers disposed between the integrated separator layer and the current collector substrate. In some examples, the electrode includes an interlocking region disposed between the active material layer and the integrated separator layer.

20 Claims, 9 Drawing Sheets

(56) References Cited

U.S. PATENT DOCUMENTS

| | | | |
|---|---|---|---|
| 8,178,209 B2 | 5/2012 | Qi et al. |
| 8,323,815 B2 | 12/2012 | Beard |
| 8,361,663 B2 | 1/2013 | Kang et al. |
| 8,409,511 B2 | 4/2013 | Thomas et al. |
| 8,570,736 B2 | 10/2013 | McClure et al. |
| 8,591,604 B2 | 11/2013 | Berkowitz et al. |
| 8,669,008 B2 | 3/2014 | Cho et al. |
| 8,778,539 B2 | 7/2014 | Ohsawa et al. |
| 8,951,669 B2 | 2/2015 | Lee et al. |
| 9,178,209 B2 | 11/2015 | Kim et al. |
| 9,209,482 B2 | 12/2015 | Chu et al. |
| 9,263,730 B2 | 2/2016 | Suzuki |
| 9,543,568 B2 | 1/2017 | Sung et al. |
| 9,564,369 B1 | 2/2017 | Kim et al. |
| 9,564,639 B2 | 2/2017 | Huang |
| 9,570,736 B2 | 2/2017 | Galande et al. |
| 9,583,756 B2 | 2/2017 | Ahn et al. |
| 10,038,193 B1 | 7/2018 | Schroder et al. |
| 10,727,464 B1 * | 7/2020 | Yao ............... H01M 50/431 |
| 10,998,553 B1 * | 5/2021 | Yao ............... H01M 50/451 |
| 2002/0028380 A1 | 3/2002 | Tanjo et al. |
| 2003/0054249 A1 | 3/2003 | Yamamoto et al. |
| 2003/0099884 A1 | 5/2003 | Chiang et al. |
| 2003/0129598 A1 | 7/2003 | Yang et al. |
| 2003/0230532 A1 | 12/2003 | Rosenblatt et al. |
| 2004/0131934 A1 | 7/2004 | Sugnaux et al. |
| 2005/0026037 A1 | 2/2005 | Riley et al. |
| 2005/0236732 A1 | 10/2005 | Brosch et al. |
| 2008/0044733 A1 | 2/2008 | Ohata et al. |
| 2008/0057401 A1 | 3/2008 | Mori et al. |
| 2009/0087731 A1 | 4/2009 | Fukui et al. |
| 2009/0155694 A1 | 6/2009 | Park |
| 2010/0092846 A1 | 4/2010 | Inagaki et al. |
| 2010/0285356 A1 | 11/2010 | Choi et al. |
| 2010/0297213 A1 | 11/2010 | Dupont et al. |
| 2011/0123866 A1 | 5/2011 | Pan et al. |
| 2011/0168550 A1 | 7/2011 | Wang et al. |
| 2011/0217585 A1 | 9/2011 | Wang et al. |
| 2011/0293990 A1 | 12/2011 | Ryu et al. |
| 2012/0141877 A1 | 6/2012 | Choi et al. |
| 2012/0164530 A1 | 6/2012 | Femmyo et al. |
| 2012/0183842 A1 | 7/2012 | Kawasaki et al. |
| 2012/0219841 A1 | 8/2012 | Bolandi et al. |
| 2012/0301789 A1 | 11/2012 | Loveness et al. |
| 2012/0328942 A1 | 12/2012 | Thomas-Alyea et al. |
| 2013/0271085 A1 | 10/2013 | Chen et al. |
| 2014/0059820 A1 | 3/2014 | Wright et al. |
| 2014/0154401 A1 | 6/2014 | Salot et al. |
| 2014/0170476 A1 | 6/2014 | Tan et al. |
| 2014/0178769 A1 | 6/2014 | Pirk et al. |
| 2014/0255779 A1 | 9/2014 | Min et al. |
| 2014/0272564 A1 | 9/2014 | Holme et al. |
| 2014/0287316 A1 | 9/2014 | Ahn et al. |
| 2014/0377661 A1 | 12/2014 | Lee et al. |
| 2015/0027615 A1 | 1/2015 | Singh et al. |
| 2015/0064556 A1 | 3/2015 | Lee et al. |
| 2015/0104714 A1 | 4/2015 | Galande et al. |
| 2015/0194678 A1 | 7/2015 | Jeong et al. |
| 2015/0246816 A1 | 9/2015 | Liu et al. |
| 2015/0270522 A1 * | 9/2015 | Yamada ............... H01M 50/449 |
| | | 429/145 |
| 2015/0372271 A1 | 12/2015 | Orilall et al. |
| 2016/0013480 A1 | 1/2016 | Sikha et al. |
| 2016/0211513 A1 | 7/2016 | Hao et al. |
| 2016/0211523 A1 | 7/2016 | Ueda et al. |
| 2016/0285101 A1 | 9/2016 | Yoshio et al. |
| 2016/0336617 A1 | 11/2016 | Yamazaki |
| 2016/0351941 A1 | 12/2016 | Kobayashi |
| 2017/0033350 A1 | 2/2017 | Mizuno et al. |
| 2017/0040603 A1 | 2/2017 | Chu et al. |
| 2017/0054148 A1 * | 2/2017 | Ding ............... H01M 4/623 |
| 2017/0062812 A1 | 3/2017 | Kim et al. |
| 2017/0062869 A1 | 3/2017 | Zhamu et al. |
| 2017/0098823 A1 | 4/2017 | Yushin et al. |
| 2017/0125788 A1 | 5/2017 | Ahn et al. |
| 2018/0287145 A1 | 10/2018 | Lee et al. |
| 2019/0198837 A1 * | 6/2019 | Yushin ............... H01M 50/449 |
| 2019/0260000 A1 | 8/2019 | Carlson et al. |
| 2019/0288318 A1 | 9/2019 | Edmundson et al. |
| 2021/0194007 A1 * | 6/2021 | Dan ............... H01M 4/04 |

FOREIGN PATENT DOCUMENTS

| | | | |
|---|---|---|---|
| JP | 2008004438 A | * | 1/2008 |
| JP | 2008004438 A | | 1/2008 |
| JP | 2008198596 A | | 8/2008 |
| JP | 2014127275 A | | 7/2014 |
| JP | 2016207258 A | | 12/2016 |
| JP | 6354420 B2 | | 7/2018 |
| KR | 20120002433 A | | 1/2012 |
| KR | 20160112266 A | | 9/2016 |
| KR | 20170007210 A | | 1/2017 |
| KR | 102017002005992 A | | 3/2017 |
| WO | 2011029058 A2 | | 3/2011 |
| WO | 2019023394 A1 | | 1/2019 |

* cited by examiner

5μm scale bar

INTEGRATED FIBROUS SEPARATOR

CROSS-REFERENCES

The following applications and materials are incorporated herein, in their entireties, for all purposes: U.S. Provisional Patent Application Ser. No. 63/226,627, filed Jul. 28, 2021.

FIELD

This disclosure relates to systems and methods for electrochemical cells. More specifically, the disclosed embodiments relate to electrochemical cells having integrated separators.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), lithium ion (Li-ion), and lithium-ion polymer (Li-ion polymer).

SUMMARY

The present disclosure provides systems, apparatuses, and methods relating to electrodes having integrated fibrous separators.

In some examples, an electrode having an integrated fibrous ceramic separator comprises: an active material layer layered onto a current collector substrate, the active material layer comprising a first plurality of active material particles adhered together by a first binder; and an integrated separator layer layered onto and directly contacting the active material layer, the integrated separator layer comprising a plurality of ceramic particles mixed with a plurality of fibers, wherein the fibers are configured to increase a lateral strength of the separator layer.

In some examples, an electrochemical cell electrode having an integrated separator layer comprises: an electrochemical cell electrode having a current collector substrate coupled to one or more active material layers each comprising a respective plurality of active material particles; and a separator layer in direct contact with an adjacent layer of the one or more active material layers, such that the one or more active material layers are between the separator layer and the current collector substrate, the integrated separator layer including a plurality of ceramic particles mixed with a plurality of fibers; wherein the fibers are configured to increase a lateral strength of the separator layer.

In some examples, a method of manufacturing an electrode including an integrated fibrous separator comprises: causing a current collector substrate and an electrode material composite dispenser to move relative to each other; and coating at least a portion of the current collector substrate with an active material composite and a separator material to produce an electrochemical cell electrode, using the dispenser, wherein coating includes: dispensing one or more active material layers each comprising a slurry of active material composite onto the current collector substrate using one or more respective first orifices of the dispenser; and dispensing a separator layer onto a topmost one of the one or more active material layers while the active material composite is wet, using one or more second orifices of the dispenser, such that the one or more active material layers are between the separator layer and the current collector substrate, the separator layer including a plurality of ceramic particles mixed with a plurality of fibers; wherein an interpenetrating boundary is formed between the separator layer and the topmost one of the one or more active material layers; and wherein the fibers are configured to increase a lateral strength of the separator layer.

Features, functions, and advantages may be achieved independently in various embodiments of the present disclosure, or may be combined in yet other embodiments, further details of which can be seen with reference to the following description and drawings.

DETAILED DESCRIPTION

Figure 1:
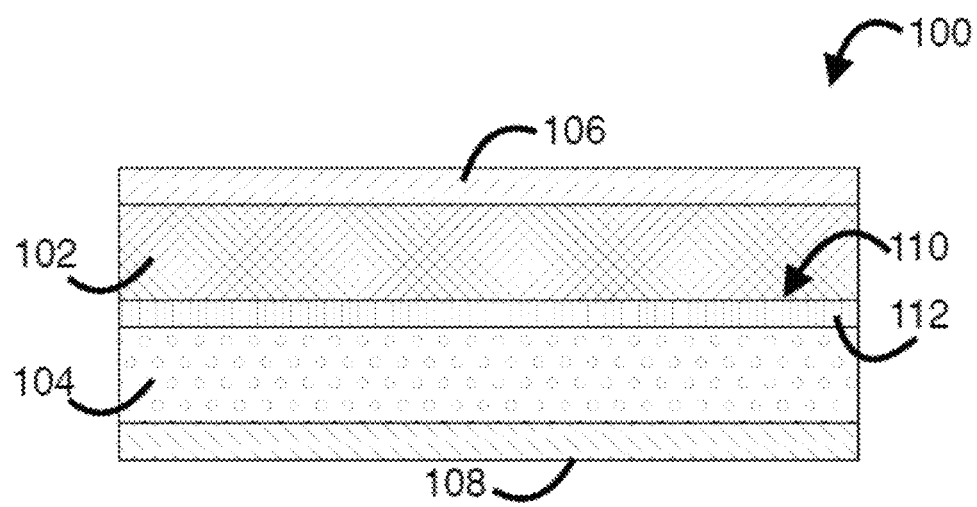
FIG. 1 is a schematic sectional view of an illustrative electrochemical cell.

Various aspects and examples of an electrode having an integrated fibrous separator, as well as related methods, are described below and illustrated in the associated drawings. Unless otherwise specified, an electrode having an integrated fibrous separator in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

"Halloysite" is an aluminosilicate clay mineral having the empirical formula $Al_2Si_2O_5(OH)_4$.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

Integrated porous inorganic separators of the present disclosure include fibrous materials and have enhanced mechanical strength when compared with integrated porous inorganic separators which do not include fibrous materials. Fibrous materials provide lateral strength to a separator layer, facilitating crack-resistance and fracture-resistance of the separator during electrode coating and/or processing. Fibrous materials also facilitate increased electrode cycle life, as the integrated porous inorganic separator layer may be resistant to cracking caused by swelling and contraction of underlying electrode active materials.

However, fibrous materials (AKA fibers) included in separator layers may increase tortuosity (e.g., a path length of ions traveling through the separator) and impedance of the integrated ceramic separator layer, especially when fibers are oriented such that long axes of the fibers are generally horizontal. Accordingly, fibers may be blended with inorganic (e.g., ceramic) particles to reduce the tortuosity of the integrated inorganic separator.

In general, an electrode having an integrated porous inorganic separator including fibrous materials according to aspects of the present disclosure may include an electrode layer having a plurality of active material particles adhered together by a first binder, and a separator layer including a plurality of inorganic (e.g., ceramic) particles and a plurality of fibers (AKA fibrous materials) adhered together by a second binder. The electrode further includes an interlocking region (AKA an interphase region) disposed between and adhering the electrode layer and the separator layer, wherein the interlocking region comprises a non-planar boundary between the electrode layer and the separator layer.

The electrode layer may include a first active material layer including a first plurality of active material particles. In some examples, the electrode layer further includes a second active material layer including a second plurality of active material particles, defining a multilayer architecture. The first and second active material layers may have different porosities, different material chemistries, different active material particle sizes, different densities, and/or differences in any alternative material properties affecting electrode function. The electrode layer may have a thickness, measured as a distance perpendicular to the plane of a current collector to which the electrode is adhered and an opposing (AKA upper) surface of the electrode layer.

The separator layer may include a plurality of inorganic particles mixed with a first plurality of fibers. The inorganic particles may comprise particles of any suitable ceramic material having an aspect ratio less than or equal to 2:1. In some examples, the inorganic particles have any suitable shape having an aspect ratio less than or equal to 2:1, such as spherical, polyhedral, egg-shaped, coral-shaped, and/or the like. In some examples, the inorganic particles may be ceramics such as aluminum oxide (i.e., alumina ($\alpha\text{-}Al_2O_3$)), corundum, calcined, tabular, synthetic boehmite, silicon oxides or silica, zirconia, and/or the like.

The fibers may comprise particles of any suitable material having an aspect ratio greater than or equal to 5:1. In some examples, the fibers comprise any suitable material for separator materials, such as polymers (e.g., Nylon, polyvinylidene difluoride (PVDF), Teflon, etc.), Halloysite, alumina, ceramics, and/or the like. In some examples, the fibers comprise Halloysite, and accordingly comprise aluminosilicate clay having a hollow tubular morphology. In some examples, the fibers may have a width of approximately 50 nm, and lengths ranging from 0.5 μm to 1 μm (resulting in an aspect ratio between 10:1 and 20:1). In some examples, the fibers have a tubular morphology, and may function as ion conduction channels throughout the separator layer. The inorganic particles and the fibers may be mixed together and adhered together by a binder. The separator layer may comprise between 5% and 95% ceramic fibers by weight, volume, or number of a ceramic portion of the separator layer (i.e., a portion excluding the binder). The fibers may have any suitable orientation. In some examples, the fibers may be oriented generally horizontally (e.g., substantially parallel to the underlying current collector) within the ceramic separator bulk.

The interlocking region may include a non-planar interpenetration of the electrode layer and the separator layer, in which first fingers or protrusions of the first layer interlock with second fingers or protrusions of the second layer. The interlocking layer or interface region created by the interpenetration of the electrode layer and the separator layer may reduce interfacial resistance and increase ion mobility through the electrode. The integrated separator may also prevent crust formation on active material surface of electrode, which may impede flow of ions.

In general, a method of manufacture for an electrode including an integrated separator may include extruding composite materials on a conductive substrate. An integrated separator layer may be extruded on the active material layer, either simultaneously or, in some examples, after drying. In some embodiments, simultaneous, near-simultaneous, or otherwise wet-on-wet extrusion of the integrated separator onto the active material layer may be utilized to create interpenetrating finger structures at a boundary between the separator and active material layers, as a result of turbulent flow at the boundary. This manufacturing process may eliminate the need to manufacture or obtain an extra component (e.g., polyolefin separator) and may reduce overall manufacturing costs.

Whereas known methods manufacture a separator for the cell independently from the electrodes, the separator described herein is manufactured as an integral part of at least one of the electrodes. Accordingly, the process of manufacturing an electrode with a separator layer is simplified. Moreover, the nonplanar interface between the separator and the active material of the electrode provides several benefits over known examples.

Examples, Components, and Alternatives

The following sections describe selected aspects of illustrative electrodes having integrated fibrous separators as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

This section describes an electrochemical cell including an electrode of the present teachings. The electrochemical cell may be any bipolar electrochemical device, such as a battery (e.g., lithium-ion battery, secondary battery).

Referring now to FIG. 1, an electrochemical cell 100 is illustrated schematically in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils or other suitable substrates. Current collector 106 is electrically coupled to cathode 102, and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid permeable, and enables the movement (flow) of ions within electrolyte 110 and between the two electrodes. As described further below, separator 112 may be integrated within one or both of cathode 102 and anode 104. In some embodiments, for example, separator 112 comprises a layer of ceramic particles applied to a top surface of an electrode (i.e., cathode 102 or anode 104), such that the ceramic particles of separator 112 are interpenetrated or intermixed with active material particles of cathode 102 or anode 104. In some examples, separator 112 comprises a plurality of ceramic particles mixed with a plurality of fibers. In some examples, electrolyte 110 includes a polymer gel or solid ion conductor, augmenting or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, or more specifically, an electrode microstructure.

In some examples, the binder is a polymer, e.g., polyvinylidene difluoride (PVdF), or Teflon (PTFE), and the conductive additive typically includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, the chemistry of the active material particles differs between cathode 102 and anode 104. For example, anode 104 may include graphite (artificial or natural), mesocarbon microbeads, hard carbon, titanate, titania, transition metals in general, elements in group 14 (e.g., carbon, silicon, tin, germanium, etc.), oxides, sulfides, transition metals, halides, and chalcogenides. On the other hand, cathode 102 may include transition metals (for example, nickel, cobalt, manganese, copper, zinc, vanadium, chromium, iron), and their oxides, phosphates, phosphites, and silicates. The cathode may also include alkalines and alkaline earth metals, aluminum, aluminum oxides and aluminum phosphates, as well as halides and chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid state diffusion coefficient of lithium ions in an active material particle; and/or a particle size distribution of active material within a composite electrode. In some examples, additional or alternative factors may contribute to the electrode microstructure and affect these rates.

B. Illustrative Electrode Including an Integrated Fibrous Ceramic Separator

Operation of an energy storage device under demanding conditions at the limits of an electrode's capabilities requires accommodating stresses induced by volume expansion (swelling) and contraction during the charging and discharging of battery electrodes. This may lead to structural and functional challenges, as an electrochemical cell including the electrode may have one or more layers, each swelling or contracting at different rates during battery charging and discharging. More specifically, active material layers of electrodes may expand and contract during battery use, while inert separator particles may remain constant in size. Polyolefin separators, commonly used in lithium-ion batteries, may shrink when subject to elevated temperatures, increasing the risk that a battery including the electrode will short circuit during use.

Including fibrous materials which are oriented along a lateral axis of a separator layer (e.g., substantially horizontally) may improve structural integrity of a ceramic separator layer. As ceramic particles of a separator layer are displaced by swelling or contracting active material particles, the fibrous materials may resist lateral deformation of the separator layer, increasing tensile strength of the separator layer.

Figure 2:
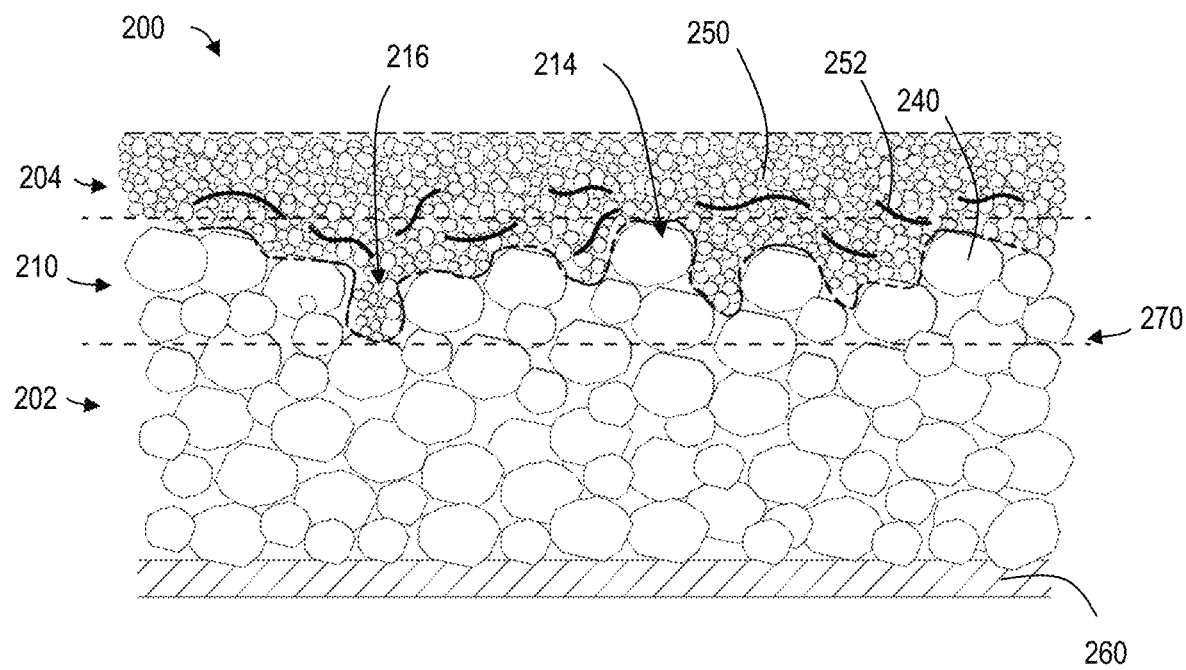
FIG. 2 is a sectional view of an illustrative electrode including an integrated fibrous ceramic separator in accordance with aspects of the present disclosure.

With reference to FIG. 2, an electrode 200 having an integrated fibrous ceramic separator is shown. Electrode 200 is an example of an anode or cathode suitable for inclusion in an electrochemical cell, similar to cathode 102 or anode 104, described above. Electrode 200 includes a current collector substrate 260 and an electrode material composite 270 layered onto the current collector substrate. Electrode material composite 270 includes an active material layer 202 and an integrated separator layer 204, with an interlocking region 210 disposed between active material layer 202 and integrated separator layer 204. Interlocking region 210 comprises a non-planar boundary between active material layer 202 and integrated separator layer 204, configured to decrease interfacial resistance between the layers and to reduce lithium plating on the electrode layer.

Active material layer 202 is disposed on and directly contacting current collector substrate 260. Active material layer 202 includes a plurality of first active material particles 240 adhered together by a first binder. Active material layer 202 may further include a conductive additive mixed with the first active material particles. In some examples, the binder is a polymer, e.g., polyvinylidene difluoride (PVdF), and the conductive additive includes a nanometer-sized carbon, e.g., carbon black or graphite. In some examples, the binder is a mixture of carboxyl-methyl cellulose (CMC) and styrene-butadiene rubber (SBR). In some examples, the conductive additive includes a ketjen black, a graphitic carbon, a low dimensional carbon (e.g., carbon nanotubes), and/or a carbon fiber.

In some examples, electrode 200 is an anode suitable for inclusion within an electrochemical cell. In the case of such an anode, active material particles 240 may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides.

In some examples, electrode 200 is a cathode suitable for inclusion within an electrochemical cell. In the case of such a cathode, active material particles 240 may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides.

Figure 3:
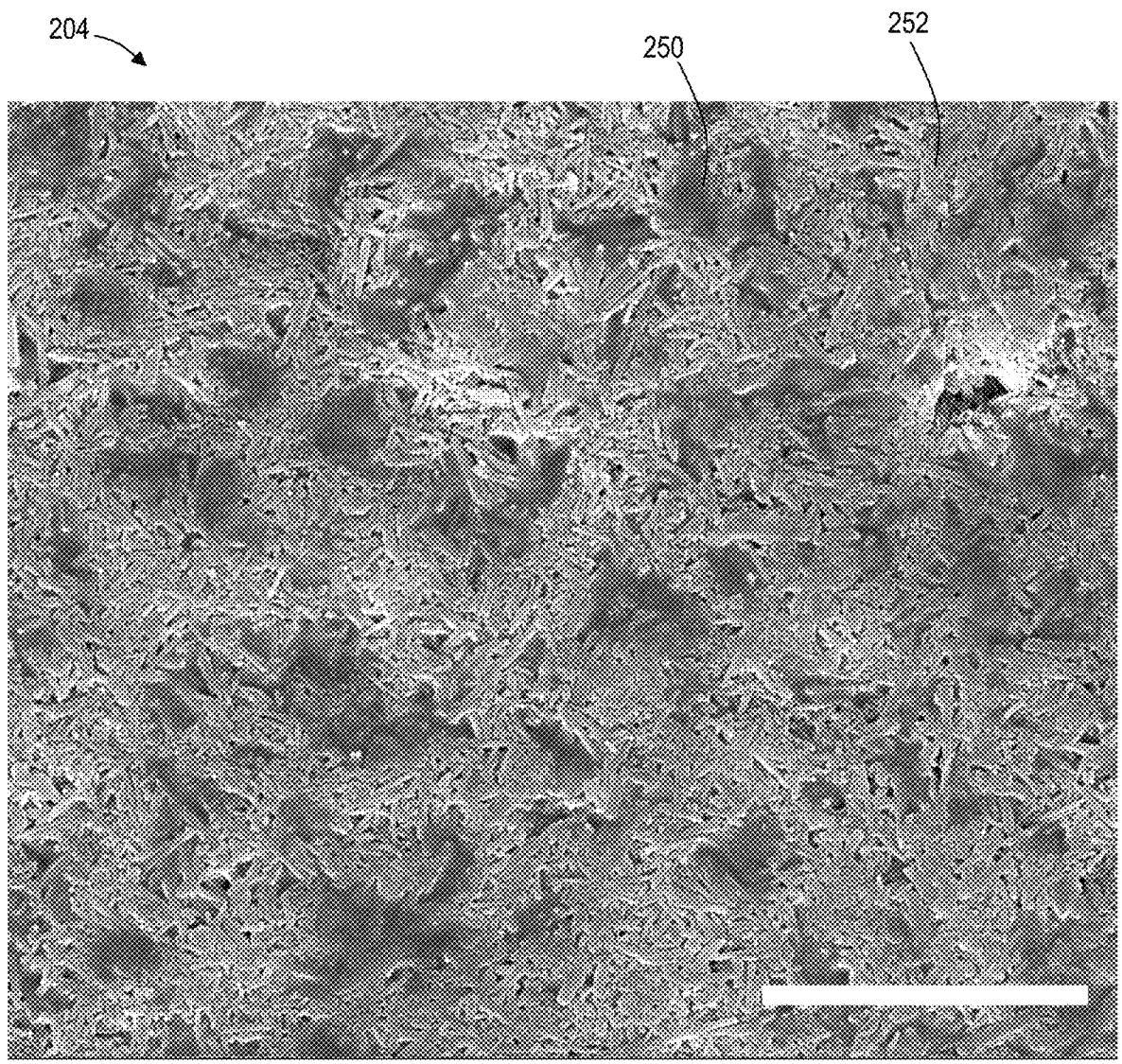
FIG. 3 is a magnified photograph depicting a top view of an illustrative fibrous ceramic separator suitable for use in the electrode of FIG. 2.

As depicted in FIGS. 2 and 3, integrated separator layer 204 is layered onto and directly contacting active material layer 202. Integrated separator layer 204 includes a plurality of ceramic particles 250 mixed with a plurality of fibers 252 and adhered together by a second binder. FIG. 3 depicts a partial top view of integrated separator layer 204. Ceramic particles 250 may comprise any suitable shape having an aspect ratio less than or equal to 2:1, such as spherical, polyhedral, egg-shaped, coral-shaped and/or the like. Although ceramic particles 250 are referred to as ceramics, particles 250 may comprise any suitable inorganic material or materials, including ceramics such as aluminum oxide (i.e., alumina ($\alpha$-$Al_2O_3$)), corundum, calcined, tabular, synthetic boehmite, silicon oxides or silica, zirconia, and/or the like. In some examples, ceramic particles 250 are electrically non-conductive. In some examples, ceramic particles 250 are electrochemically inactive.

Fibers 252 may comprise any suitable shape having an aspect ratio greater than or equal to 5:1. Fibers 252 may comprise any suitable fibrous material, such as Nylon, PVdF (polyvinylidene difluoride), Teflon, alumina, Halloysite, and/or the like. In some examples, fibers 252 comprise Halloysite and accordingly comprise an aluminosilicate clay having a hollow tubular morphology. Halloysite fibers may have a width of approximately 50 nm and a length between 0.5 μm and 1 μm, resulting in an aspect ratio between 10:1 and 20:1.

Fibers 252 may be oriented such that a long axis of the fibers runs laterally through the integrated separator layer (e.g., horizontally). Accordingly, fibers 252 may increase a lateral strength of the separator layer, which may decrease cracking and/or fracturing of the separator layer during electrode manufacture and use.

Ceramic particles 250 may have a greater hardness than active material particles 240. As a result, separator layer 204 may have a higher resistance to densification and lower compressibility than active material layer 202. In some examples, the second binder is a polymer, such as polyvinylidene difluoride (PVdF), styrene butadiene rubber (SBR) and carboxy methyl cellulose (CMC), polyvinyl alcohol, polyacrylic acid, fibrillated Teflon (PTFE), and/or the like. Integrated separator layer 204 may have any thickness suitable for allowing ionic conduction while electrically insulating the electrode. In some examples, separator layer 204 may have a thickness between one μm and fifty μm.

Integrated separator layer 204 may comprise varying mass fractions of inorganic particles (e.g., ceramic particles), fibers, and varying mass fractions of binders and other additives. In some examples, the separator layer is between 50% and 99% inorganic material. In other examples, the separator layer is greater than 99% inorganic material and less than 1% binder. In the examples having greater than 99% inorganic material, the electrode may be manufactured in a similar fashion to electrodes with separator layers having lower percentages of inorganic material, optionally followed by ablation of excess binder during post-processing.

Additionally, as inclusion of fibrous materials within the separator layer may increase tortuosity and impedance of the separator layer (especially when the fibrous materials are coated in a lateral position), the fibrous materials may be blended with ceramic particles in different ratios to reduce tortuosity. The separator layer may comprise between 5% and 95% fibers by weight, volume, or number of a ceramic portion of the separator layer (i.e., a portion excluding the binder). The separator layer may comprise between 5% and 95% ceramic particles by weight, volume, or number of the ceramic portion.

In some examples, an additional polyolefin separator layer may be added on a top surface of the integrated separator layer.

Interlocking region 210 includes a non-planar boundary between active material layer 202 and separator layer 204. Active material layer 202 and separator layer 204 have respective, three-dimensional, interpenetrating fingers 214 and 216 that interlock the two layers together, forming a mechanically robust interface that is capable of withstanding stresses, such as those due to electrode expansion and contraction. Additionally, the non-planar surfaces defined by fingers 214 and fingers 216 represent an increased total surface area of the interface boundary, which may provide reduced interfacial resistance and may increase ion mobility through the electrode. Fingers 214 and 216 may be interchangeably referred to as fingers, protrusions, extensions, projections, and/or the like. Furthermore, the relationship between fingers 214 and 216 may be described as interlocking, interpenetrating, intermeshing, interdigitating, interconnecting, interlinking, and/or the like.

Fingers 214 and fingers 216 are a plurality of substantially discrete interpenetrations, wherein fingers 214 are generally made up of the electrode's active material particles 240 and fingers 216 are generally made up of ceramic separator particles 250 and fibers 252. The fingers are three-dimensionally interdigitated, analogous to an irregular form of the stud-and-tube construction of Lego bricks. Accordingly, fingers 214 and 216 typically do not span the electrode in any direction, such that a cross section perpendicular to that of FIG. 2 will also show a non-planar, undulating boundary similar to the one shown in FIG. 2. Interlocking region 210 may alternatively be referred to as a non-planar interpenetration of active material layer 202 and separator layer 204, including fingers 214 interlocked with fingers 216.

Figure 4:
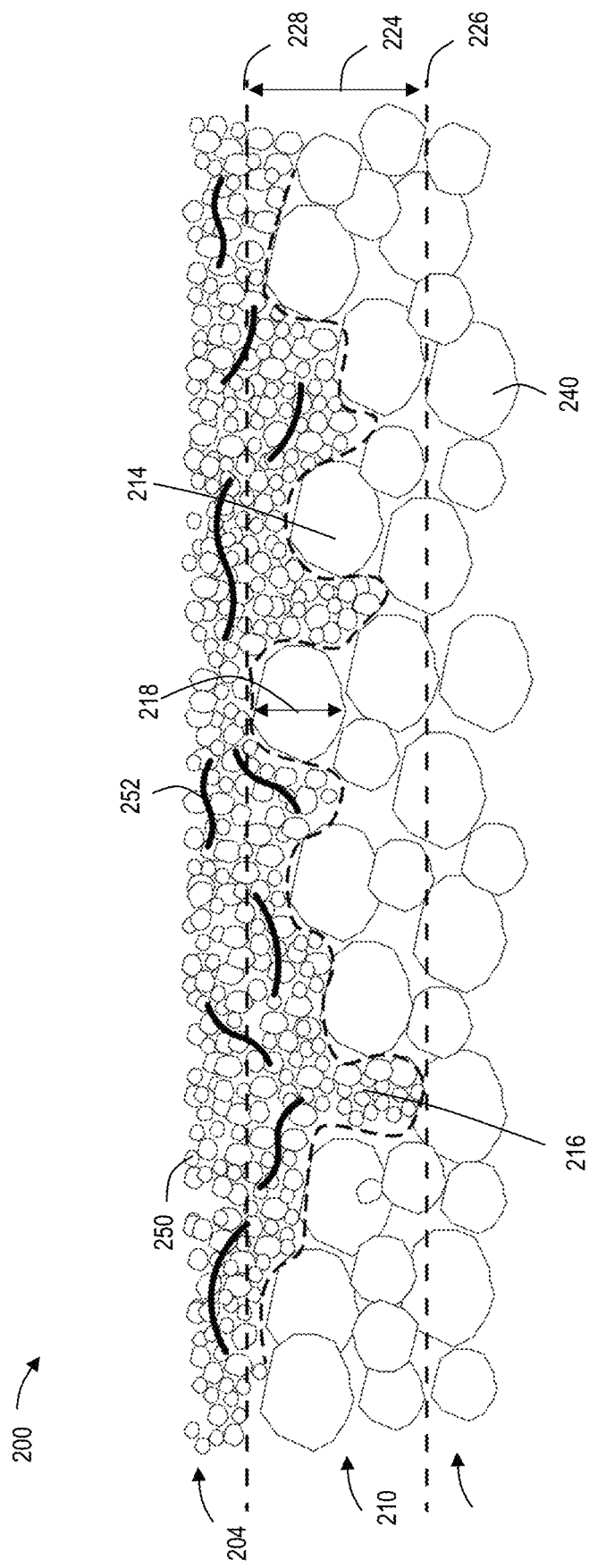
FIG. 4 is a sectional view of an interlocking region included within the illustrative electrode of FIG. 2.

As shown in FIG. 4, although fingers 214 and 216 may not be uniform in size or shape, the fingers may have an average or typical length 218. In some examples, length 218 of fingers 214 and 216 may be greater than two times the average particle size of the first active material particles or the ceramic particles, whichever is smaller. In some examples, length 218 of fingers 214 and 216 may fall in a range between two and five times the average particle size of the first active material particles or the ceramic particles, whichever is smaller. In some examples, length 218 of fingers 214, 216 may fall in a range between six and ten times the average particle size of the first active material particles or the ceramic particles, whichever is smaller. In some examples, length 218 of fingers 214 and 216 may fall in a range between eleven and fifty times the average particle size of the first active material particles or the ceramic particles, whichever is smaller. In some examples, length 218 of fingers 214 and 216 may be greater than fifty times the average particle size of the first active material particles or the ceramic particles, whichever is smaller.

In some examples, length 218 of fingers 214 and 216 may be greater than two microns. In some examples, length 218 of fingers 214 and 216 may fall in a range of approximately five hundred to approximately one thousand nanometers. In some examples, length 218 of fingers 214 and 216 may fall in a range of approximately one to approximately five μm. In some examples, length 218 of fingers 214 and 216 may fall in a range between approximately six and approximately ten μm. In another example, length 218 of fingers 214 and 216 may fall in a range between approximately eleven and approximately fifty μm. In another example, length 218 of fingers 214 and 216 may be greater than approximately fifty μm.

In the present example, a total thickness 224 of interlocking region 210 is defined by the level of interpenetration between the two electrode material layers (first active material layer 202 and separator layer 204). A lower limit 226 may be defined by the lowest point reached by separator layer 204 (i.e. by fingers 216). An upper limit 228 may be defined by the highest point reached by first active material layer 202 (i.e. by fingers 214). Total thickness 224 of interlocking region 210 may be defined as the separation or distance between limits 226 and 228. In some examples, the total thickness of interlocking region 210 may fall within one or more of various relative ranges, such as between approximately 200% (2×) and approximately 500% (5×), approximately 500% (5×) and approximately 1000% (10×), approximately 1000% (10×) and approximately 5000% (50×), and/or greater than approximately 5000% (50×) of the average particle size of the first active material layer or the ceramic particles, whichever is smaller.

In some examples, total thickness 224 of interlocking region 210 may fall within one or more of various absolute ranges, such as between approximately 500 and one thousand nanometers, one and approximately ten µm, approximately ten and approximately fifty µm, and/or greater than approximately fifty µm.

In the present example, first active material particles 240 in first active material layer 202 have a distribution of volumes which have a greater average than an average volume of ceramic particles 250 in separator layer 204 i.e., a larger average size. In some examples, first active material particles 240 have a collective surface area that is less than the collective surface area of ceramic particles 250.

In the present example, first active material particles 240 and ceramic particles 250 are substantially spherical in particle morphology. In other examples, one or both of the plurality of particles in either the first active material layer or the separator layer may have particle morphologies that are: spherical, flake-like, platelet-like, irregular, potato-shaped, oblong, fractured, agglomerates of smaller particle types, and/or a combination of the above.

When particles of electrode portion 200 are lithiating or delithiating, electrode portion 200 remains coherent, and the first active material layer and the separator layer remain bound by interlocking region 210. In general, the interdigitation or interpenetration of fingers 214 and 216, as well as the increased surface area of the interphase boundary, function to adhere the two zones together.

In one example, electrode portion 200 is a portion of a cathode included in a lithium ion cell. In this example during charging of the lithium ion cell, first active material particles 240 delithiate. During this process, the active material particles may contract, causing active material layer 202 to contract. In contrast, during discharging of the cell, the active material particles lithiate and swell, causing active material layer 202 to swell.

In an alternate example, electrode portion 200 is a portion of an anode included in a lithium ion cell. In this example, during charging of the lithium ion cell, first active material particles 240 lithiate. During this process, the active material particles may swell, causing active material layer 202 to swell. In contrast, during discharging of the cell, first active material particles 240 delithiate and contract, causing contraction of active material layer 202.

In either of these examples, during swelling and contracting, electrode portion 200 may remain coherent, and active material layer 202 and separator layer 204 remain bound by interlocking region 210. This bonding of the active material layer and separator layer may decrease interfacial resistance between the layers and maintain mechanical integrity of an electrochemical cell including the electrode.

Interlocking region 210 may comprise a network of fluid passageways defined by active material particles, ceramic particles, binder, conductive additives, and/or additional layer components. These fluid passages are not hampered by calendering-induced changes in mechanical or morphological state of the particles due to the non-planar boundary included in the interlocking region. In contrast, a substantially planar boundary is often associated with the formation of a crust layer upon subsequent calendering. Such a crust layer is disadvantageous as it can significantly impede ion conduction through the interlocking region. Furthermore, such a crust layer also represents a localized compaction of active material particles that effectively result in reduced pore volumes within the electrode. This may be an issue of particular importance for anodes, as solid electrolyte interphase (SEI) film buildup on active material particles clogs pores included within the electrode at a quicker rate, leading to lithium plating, decreasing safety and cycle life of the electrode.

An anode with integrated fibrous ceramic separator according to the present disclosure may experience additional benefits over alternate electrode forms. As anodes may include active material particles with comparatively larger average particle size than other electrodes (e.g. cathodes), anodes may experience increased compressibility from simultaneous calendering with an integrated separator layer. As ceramic separator particles may have a hardness greater than a hardness of the anode active material particles and therefore a greater resistance to densification during a calendering process, the ceramic separator layer may transfer compressive loads to the anode layer disposed beneath the ceramic separator layer.

C. Illustrative Multi-Layered Electrode with Integrated Separator

Figure 5:
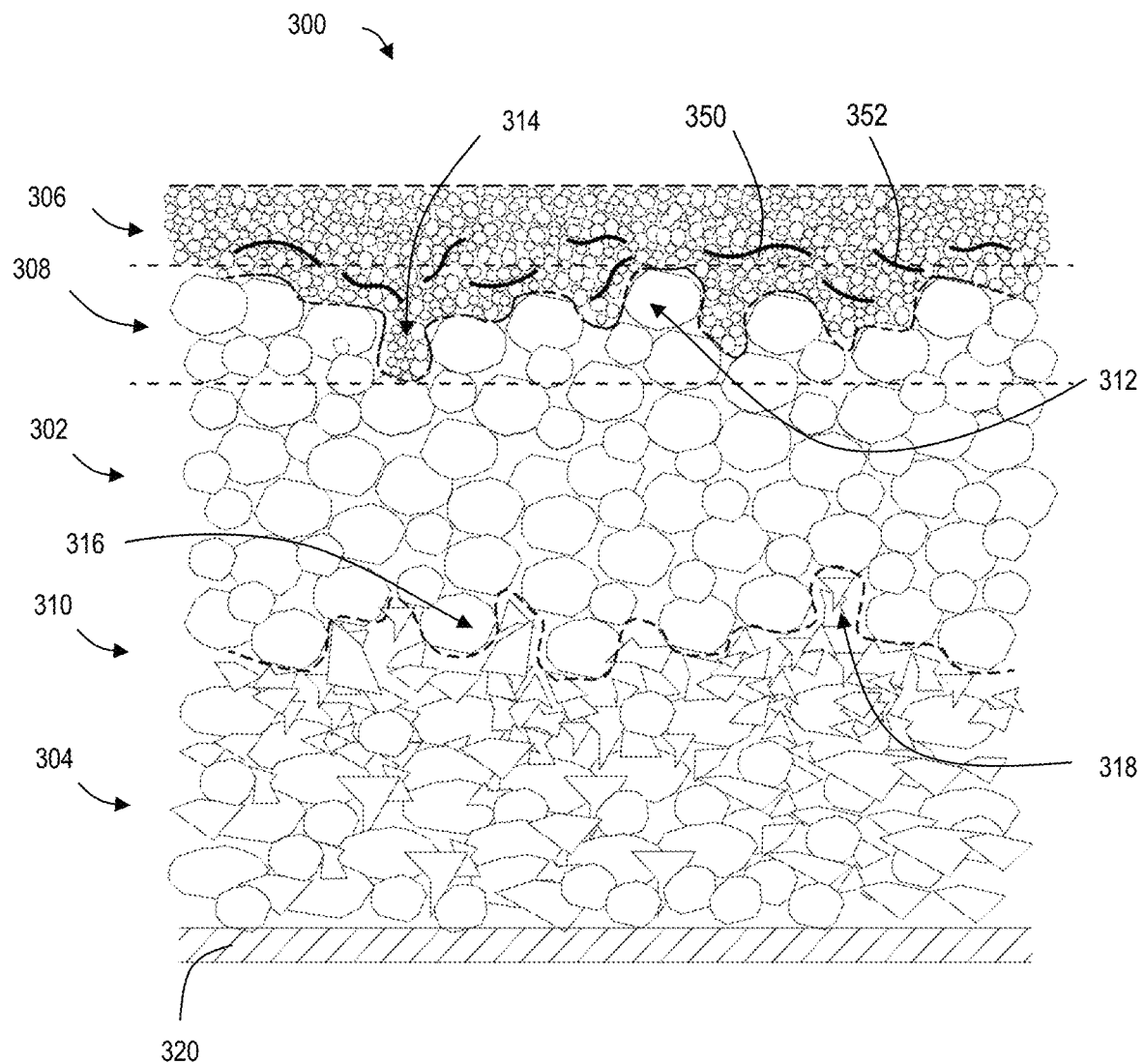
FIG. 5 is a sectional view of an illustrative integrated ceramic separator coating with a multilayered electrode.

FIG. 5 is an illustrative multi-layered electrode 300 including a first active material layer 302, a second active material layer 304, and a separator layer 306. Second active material layer 304 may be disposed adjacent to a current collector substrate 320. First active material layer 302 may be layered on top of second active material layer 304. Separator layer 306 may be layered on top of first active material layer 302. First active material layer 302 may include a plurality of first active material particles adhered together by a first binder. Second active material layer 304 may include a plurality of second active material particles adhered together by a second binder. The first and second active material particles may be substantially similar to active material particles 240, described above. In some examples, the first and second active material particles have different shapes, sizes, chemical compositions, porosities, crystallinities, and/or any other suitable differentiating factor. In some examples, the first and second active material layers have different porosities, tortuosities, densities, thicknesses, and/or any other suitable differentiating factor. In some examples, the first and second active material layers are substantially similar in physical and/or chemical composition. Separator layer 306 may include a plurality of inorganic particles 350 mixed with a plurality of fibers 352 and adhered together by a third binder. The inorganic particles may be substantially similar to ceramic particles 250, described above. The fibers may be substantially similar to fibers 252, described above.

A first interlocking region 308 is formed between separator layer 306 and first active material layer 302. A second interlocking region 310 is formed between first active material layer 302 and second active layer 304.

First interlocking region 308 may include a non-planar boundary between first active material layer 302 and separator layer 306. First active material layer 302 may have a first plurality of fingers 312 extending toward separator layer 306. Separator layer 306 may have a second plurality of fingers 314. First interlocking region 308 may include an interpenetration of fingers 312 and fingers 314, which may bind the first active material layer and the separator layer together.

Second interlocking region 310 may include a non-planar boundary between first active material layer 302 and second active material layer 304. First active material layer 302 may have a third plurality of fingers 316 extending toward current collector substrate 320. Second active material layer 304 may have a fourth plurality of fingers 318. Second interlocking region 310 may include an interpenetration of fingers 316 and 318, which may bind the first and second active material layers together. The configuration of the fingers in first interlocking region 308 and second interlocking region 310 is substantially similar to the configuration of the fingers in interlocking region 210 of FIG. 3, described above.

D. Illustrative Manufacturing Method

Figure 6:
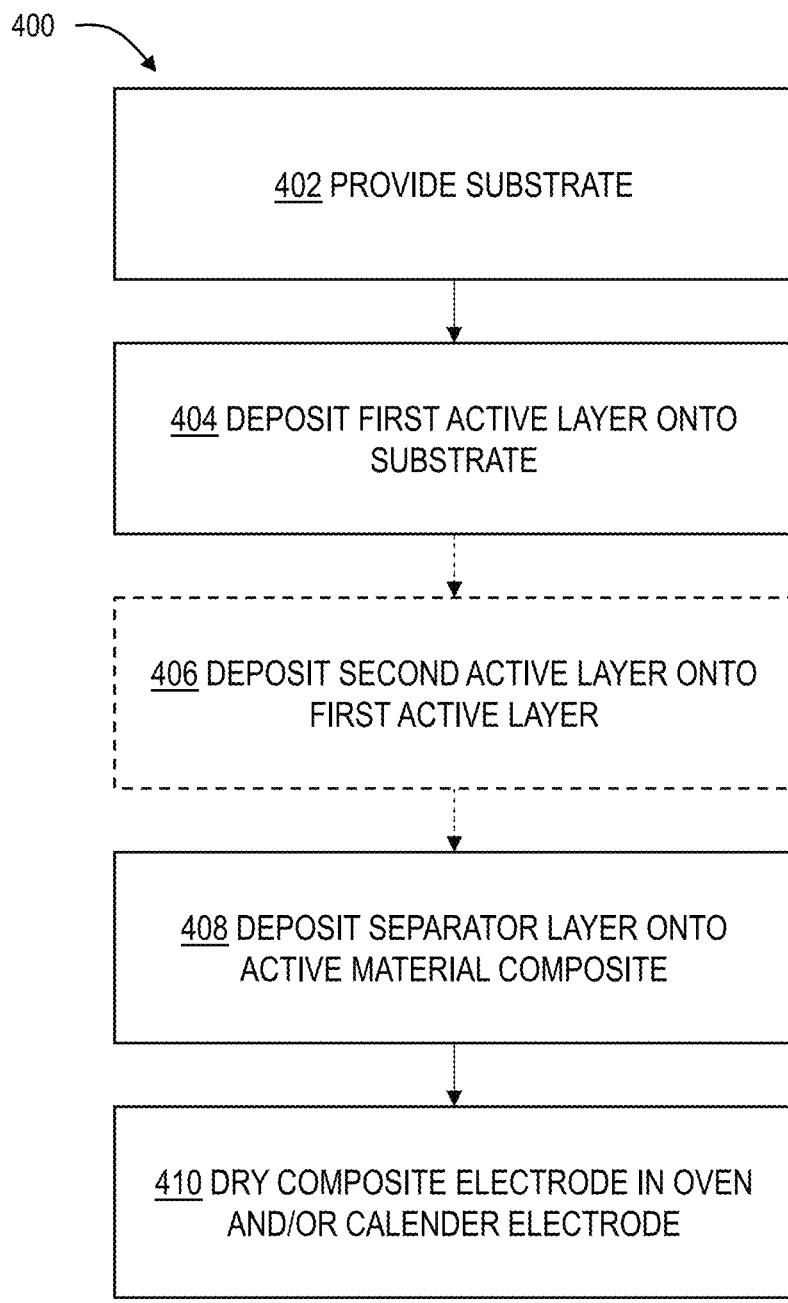
FIG. 6 is a flow chart depicting steps of an illustrative method for manufacturing an electrode including an integrated fibrous ceramic separator according to the present teachings.
Figure 7:
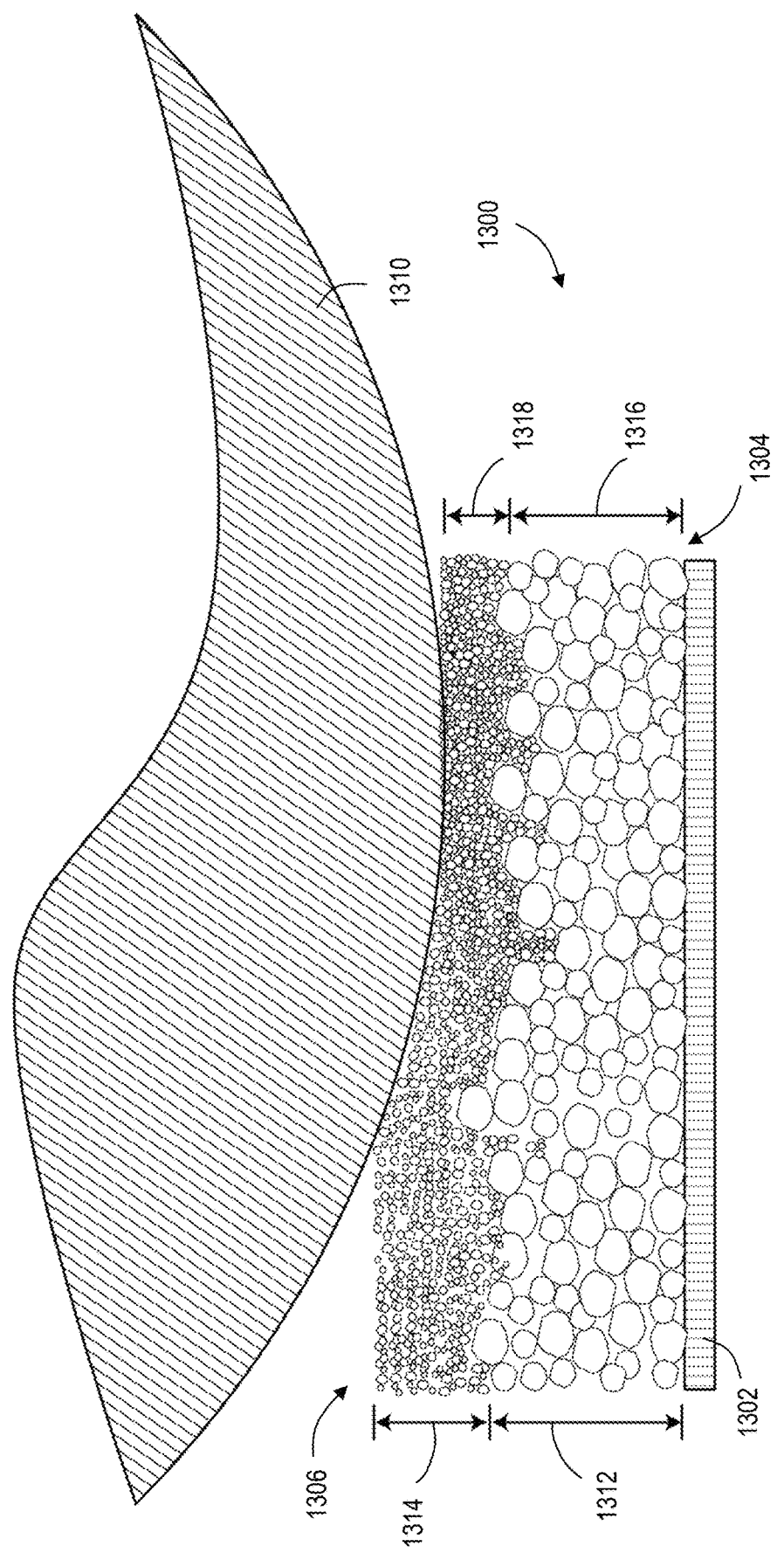
FIG. 7 is a sectional view of an illustrative electrode undergoing a calendering process in accordance with aspects of the present disclosure.

The following describes steps of an illustrative method 400 for forming an electrode including an integrated fibrous ceramic separator; see FIGS. 6-7. Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

FIG. 6 is a flowchart illustrating steps performed in an illustrative method, and may not recite the complete process or all steps of the method. Although various steps of method 400 are described below and depicted in FIG. 6, the steps need not necessarily all be performed, and in some cases may be performed simultaneously, or in a different order than the order shown.

Step 402 of method 400 includes providing a substrate, wherein the substrate includes any suitable structure and material configured to function as a conductor in a secondary battery of the type described herein. In some examples, the substrate comprises a current collector. In some examples, the substrate comprises a metal foil. The term "providing" here may include receiving, obtaining, purchasing, manufacturing, generating, processing, preprocessing, and/or the like, such that the substrate is in a state and configuration for the following steps to be carried out.

Method 400 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers, including a plurality of active material particles, and one or more separator layers, each including a plurality of inorganic material particles.

Step 404 of method 400 includes coating a first active layer of a composite electrode on a first side of the substrate, forming an active material composite. In some examples, the first active layer may include a plurality of first active material particles adhered together by a first binder, the first particles having a first average particle size (or other first particle distribution). In some examples, the composite electrode is an anode suitable for inclusion within an electrochemical cell. In this case, the first active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the composite electrode is a cathode suitable for inclusion within an electrochemical cell. In this case, the first active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides.

The coating process of step 404 may include any suitable coating method(s), such as slot die, blade coating, spray-based coating, electrostatic jet coating, or the like. In some examples, the first layer is coated as a wet slurry of solvent, e.g., water or NMP (N-Methyl-2-pyrrolidone), binder, conductive additive, and active material. In some examples, the first layer is coated dry, as an active material with a binder and/or a conductive additive. Step 404 may optionally include drying the first layer of the composite electrode.

Optional step 406 of method 400 includes optionally coating a second active layer of the active material composite onto the first active layer, forming a multilayered (e.g., stratified structure) electrode. In some examples, the second active layer may include a plurality of second active material particles adhered together by a second binder, the second active material particles having a second average particle size (or other second particle distribution). In some examples, the composite electrode is an anode suitable for inclusion within an electrochemical cell. In this case, the second active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the composite electrode is a cathode suitable for inclusion within an electrochemical cell. In this case, the second active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides. In some examples, the second layer is coated as a solventless (i.e., dry) layer including a plurality of second active material particles adhered together by a second binder. In some examples, coating the second layer dry includes spraying the dry coating onto the first active material layer using any suitable method, such as electrostatically spraying, particle coating, high-velocity spraying, and/or the like. In some examples, the solventless second layer includes a conductive additive.

Step 408 of method 400 includes coating a separator layer onto the active material composite, forming a multilayered (e.g., stratified) structure (if coated onto the first active layer). The separator layer may include a plurality of ceramic particles mixed with a plurality of fibers and adhered together by a third binder, the ceramic particles having a second average particle size (or other second particle distribution). The fibers may be configured to increase a lateral strength of the separator layer. In some examples, the second layer comprises ceramic particles having an aspect ratio less than or equal to 2:1, such as aluminum oxide (i.e., alumina ($\alpha$-$Al_2O_3$)), corundum, calcined, tabular, synthetic boehmite, silicon oxides or silica, zirconia, and/or the like. The separator layer may further comprise fibers having an aspect ratio greater than or equal to 5:1. The fibers may comprise any suitable fibrous material, such as Nylon, PVdF (polyvinylidene difluoride), Teflon, alumina, Halloysite, and/or the like. In some examples, the fibers comprise Halloysite and accordingly comprise an aluminosilicate clay having a hollow tubular morphology. Halloysite fibers may have a width of approximately 50 nm and a length between 0.5 μm and 1 μm, resulting in an aspect ratio between 10:1 and 20:1. The separator layer may include any suitable blend of ceramic particles and fibers, with a ceramic portion of the separator layer (i.e., portions of the separator layer not including binders) varying in composition from 95% ceramic particles and 5% fibers to 5% ceramic particles and 95% fibers. In some examples, the separator layer is coated as a solventless (i.e., dry) layer including a plurality of ceramic particles mixed with a plurality of fibers and adhered together by a third binder. In some examples, coating the separator layer dry includes spraying the dry coating onto the active material composite using any suitable method, such as electrostatically spraying, particle coating, high-velocity spraying, and/or the like.

In some examples, steps 404 and 408 (and optional step 406) may be performed substantially simultaneously. For example, the slurries may be extruded through their respective orifices simultaneously. This forms a two-layer (or three-layer) slurry bead and coating on the moving substrate. In some examples, difference in viscosities, difference in surface tensions, difference in densities, difference in solids contents, and/or different solvents used between the first active material slurry and the second active material slurry or the separator slurry may be tailored to cause interpenetrating finger structures at the boundary between the composite layers. In some embodiments, the viscosities, surface tensions, densities, solids contents, and/or solvents may be substantially similar. Creation of interpenetrating structures, if desired, may be facilitated by turbulent flow at the wet interface between the first active material slurry and the second active material slurry or the second separator slurry, creating partial intermixing of the two slurries.

To facilitate proper curing in the drying process, the first layer (closest to the current collector) may be configured (in some examples) to be dried from solvent prior to the second layer (further from the current collector) so as to avoid creating skin-over effects and blisters in the resulting dried coatings.

In some examples, an optional second active material layer is included, e.g., for a total of three layers (more or fewer layers may be present). A triple slot-die coating method may be utilized for triple-layered structures. In some examples, any of the described steps may be repeated to form three or more layers. For example, an additional layer or layers may include active materials to form a multilayered electrode structure before adding the separator layer. Any method described herein to impart structure between the first active material layer and the separator coating may be utilized to form similar structures between any additional layers deposited during the manufacturing process.

Method 400 may further include drying the composite electrode in step 410, and/or calendering the composite electrode. Both the active and separator layers may experience the drying process and the calendering process as a combined structure. In some examples, step 410 may be combined with calendering (e.g., in a hot roll process). In some examples, drying step 410 includes a form of heating and energy transport to and from the electrode (e.g., convection, conduction, radiation) to expedite the drying process. In some examples, calendering is replaced with another compression, pressing, or compaction process. In some examples, calendering the electrode may be performed by pressing the combined layers against the substrate, such that electrode density is increased in a non-uniform manner, with the first active layer having a first porosity and the separator layer having a lower second porosity.

FIG. 7 shows an electrode undergoing the calendering process, in which particles in a second layer 906 ((e.g., the separator layer) can be calendered with a first layer 904 (e.g., the active material layer). This may prevent a "crust" formation on the electrode, specifically on the active material layer. A roller 910 may apply pressure to a fully assembled electrode 900. Electrode 900 may include first layer 904 and second layer 906 applied to a substrate web 902. First layer 904 may have a first uncompressed thickness 912 and second layer 906 may have a second uncompressed thickness 914 prior to calendering. After the electrode has been calendered, first layer 904 may have a first compressed thickness 916 and second layer 906 may have a second compressed thickness 918. In some embodiments, second layer 906 may have a greater resistance to densification and a lower compressibility than first layer 904. After a certain level of densification, a higher tolerance to bulk compression of the separator layer may transfer a load to the more compressible electrode layer below. This process may effectively densify the anode without over densifying the separator layer. In some examples, an electrode includes three or more layers, and adjacent electrode layers transfer loads to adjacent layers below.

E. Illustrative Method of Manufacturing Electrode Including Solventless Fibrous Separator The following describes steps of an illustrative method 500 for forming an electrode including an integrated solventless fibrous ceramic separator; see FIG. 8.

Aspects of electrodes and manufacturing devices described herein may be utilized in the method steps described below. Where appropriate, reference may be made to components and systems that may be used in carrying out each step. These references are for illustration, and are not intended to limit the possible ways of carrying out any particular step of the method.

Figure 8:
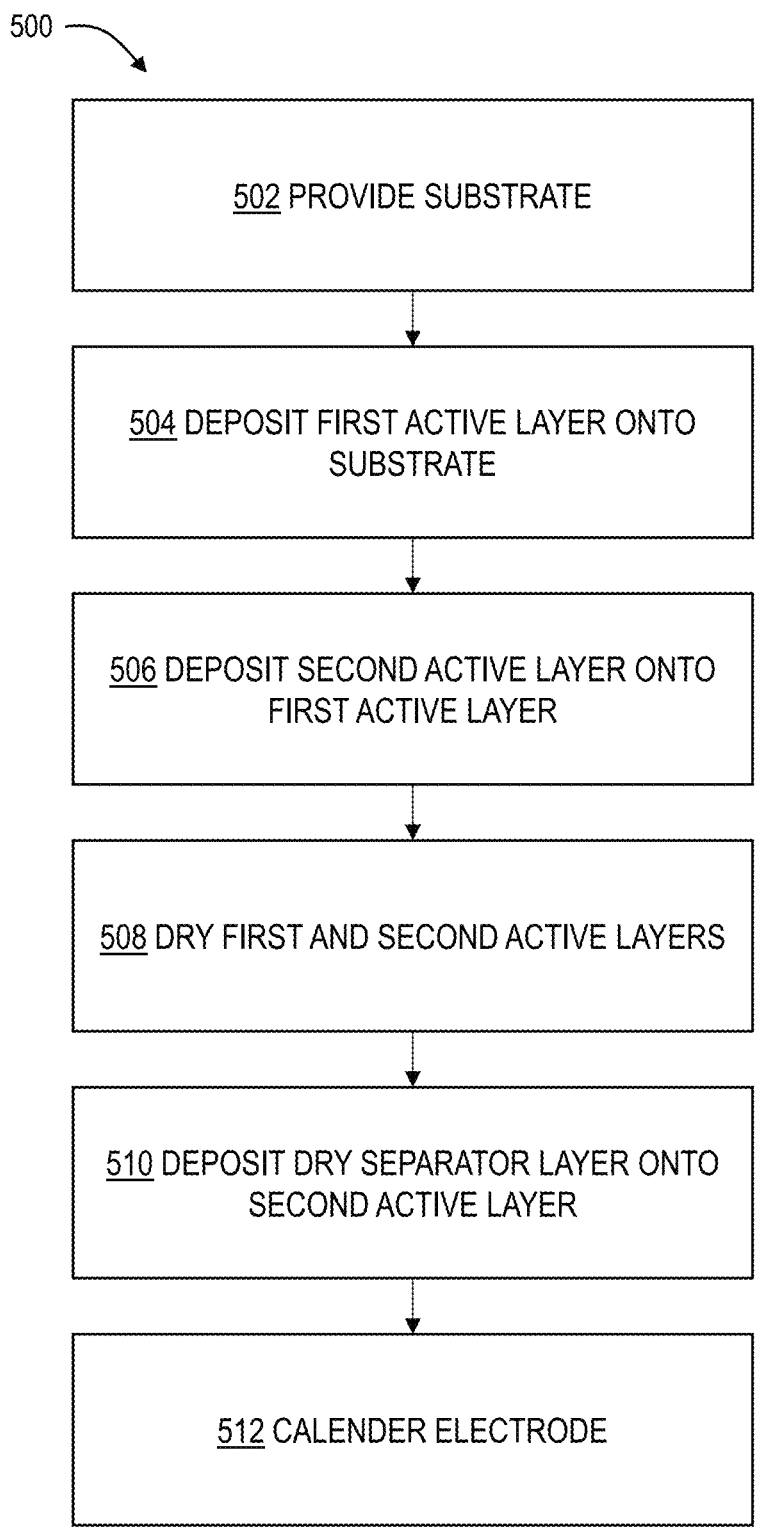
FIG. 8 is a flow chart depicting steps of an illustrative method for manufacturing an electrode including a solventless integrated fibrous ceramic separator according to the present teachings.

FIG. 8 is a flowchart illustrating steps performed in an illustrative method, and may not recite the complete process or all steps of the method. Although various steps of method 500 are described below and depicted in FIG. 8, the steps need not necessarily all be performed, and in some cases may be performed simultaneously, or in a different order than the order shown.

Step 502 of method 500 includes providing a substrate, wherein the substrate includes any suitable structure and material configured to function as a conductor in a secondary battery of the type described herein. In some examples, the substrate comprises a current collector. In some examples, the substrate comprises a metal foil. The term "providing" here may include receiving, obtaining, purchasing, manufacturing, generating, processing, preprocessing, and/or the like, such that the substrate is in a state and configuration for the following steps to be carried out.

Method 500 next includes a plurality of steps in which at least a portion of the substrate is coated with an electrode material composite. This may be done by causing a current collector substrate and an electrode material composite dispenser to move relative to each other, by causing the substrate to move past an electrode material composite dispenser (or vice versa) that coats the substrate as described below. The composition of material particles in each electrode material composite layer may be selected to achieve the benefits, characteristics, and results described herein. The electrode material composite may include one or more electrode layers, including a plurality of active material particles, and one or more separator layers, each including a plurality of inorganic material particles.

Step 504 of method 500 includes coating a first active layer of a composite electrode on a first side of the substrate, forming an active material composite. In some examples, the first active layer may include a plurality of first active material particles adhered together by a first binder, the first particles having a first average particle size (or other first particle distribution). In some examples, the composite electrode is an anode suitable for inclusion within an electrochemical cell. In this case, the first active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the composite electrode is a cathode suitable for inclusion within an electrochemical cell. In this case, the first active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides.

The coating process of step 504 may include any suitable coating method(s), such as slot die, blade coating, spray-based coating, electrostatic jet coating, or the like. In some examples, the first layer is coated as a wet slurry of solvent, e.g., water or NMP (N-Methyl-2-pyrrolidone), binder, conductive additive, and active material.

Step 506 of method 500 includes coating a second active layer of the active material composite onto the first active layer, forming a multilayered (e.g., stratified structure) electrode. In some examples, the second active layer may include a plurality of second active material particles adhered together by a second binder, the second active material particles having a second average particle size (or other second particle distribution). In some examples, the composite electrode is an anode suitable for inclusion within an electrochemical cell. In this case, the second active material particles may comprise graphite (artificial or natural), hard carbon, titanate, titania, transition metals in general, elements in group 14 (e.g., carbon, silicon, tin, germanium, etc.), oxides, sulfides, transition metals, halides, and chalcogenides. In some examples, the composite electrode is a cathode suitable for inclusion within an electrochemical cell. In this case, the second active material particles may comprise transition metals (for example, nickel, cobalt, manganese, copper, zinc, vanadium, chromium, iron), and their oxides, phosphates, phosphites, and silicates. The cathode active material particles may also include alkalines and alkaline earth metals, aluminum, aluminum oxides and aluminum phosphates, as well as halides and chalcogenides.

To facilitate proper curing in the drying process, the first layer (closest to the current collector) may be configured (in some examples) to be dried from solvent prior to the second layer (further from the current collector) so as to avoid creating skin-over effects and blisters in the resulting dried coatings.

In some examples, steps 504 and 506 may be performed substantially simultaneously. For example, the slurries may be extruded through their respective orifices simultaneously. This forms a two-layer (or three-layer) slurry bead and coating on the moving substrate. In some examples, difference in viscosities, difference in surface tensions, difference in densities, difference in solids contents, and/or different solvents used between the first active material slurry and the second active material slurry or the separator slurry may be tailored to cause interpenetrating finger structures at the boundary between the composite layers. In some embodiments, the viscosities, surface tensions, densities, solids contents, and/or solvents may be substantially similar. Creation of interpenetrating structures, if desired, may be facilitated by turbulent flow at the wet interface between the first active material slurry and the second active material slurry, creating partial intermixing of the two slurries.

In some examples, an optional third active material layer is included, e.g., for a total of three layers (more or fewer layers may be present). A triple slot-die coating method may be utilized for triple-layered structures. In some examples, any of the described steps may be repeated to form three or more layers. For example, an additional layer or layers may include active materials to form a multilayered electrode structure before adding the separator layer. Any method described herein to impart structure between the first active material layer and second active material layer may be utilized to form similar structures between any additional layers deposited during the manufacturing process.

Step 508 of method 500 includes drying the first active material layer and the second active material layer. In some examples, drying step 508 includes a form of heating and energy transport to and from the electrode (e.g., convection, conduction, radiation) to expedite the drying process. Drying the first active material layer and the second active material layer may include evaporating any solvents included within the electrode slurries.

Step 510 of method 500 includes dry coating a separator layer onto the active material composite. Dry coating the separator layer onto the active material composite reduces a chance of pinholes and/or cracks forming in the separator layer. The separator layer may include a plurality of ceramic particles mixed with a plurality of fibers and adhered together by a third binder, the ceramic particles having a second average particle size (or other second particle distribution). The fibers may be configured to increase a lateral strength of the separator layer.

The third binder may comprise any suitable material for use in dry electrode processing, such as polytetrafluoroethylene (PTFE); polyolefins such as polyvinylidene difluoride (PVDF), polyethylene (PE), polypropylene (PP) polyethylene oxide (PEO), and/or their mixtures or copolymers; steryl butadiene rubber (SBR); polyacrylic acid; polyvinyl alcohol; carboxymethyl cellulose; and/or the like. In some examples, the dry electrode mixtures include binder mixtures comprising a plurality of binders. Exemplary binder mixtures include PTFE mixed with PVDF; PTFE mixed with co-polymers of PVDF, PTFE mixed with PEO; PTFE mixed with PP; and/or the like.

In some examples, dry coating a separator layer onto the active material composite includes depositing the separator powder directly onto the active material composite via gravity fed hoppers or an alternate assisted process, and/or spraying the dry coating onto the active material composite using any suitable method, such as electrostatically spraying, particle coating, high-velocity spraying, and/or the like.

In some examples, dry coating a separator layer onto the active material composite includes compressing a separator mix including the ceramic particles, fibers, and the third binder to form a separator film. Compressing the separator mix includes applying pressure the separator mix. In some examples, compressing the separator mix includes pressing the separator mix between a pair of rollers, thereby forming a separator film. In some examples, rollers utilized to compress the separator mix include raised, embossed, and/or engraved patterns disposed on external surfaces, which may increase a surface roughness of the separator film. In some examples, dry coating the separator layer onto the active material composite further includes heating the separator film. Heating the separator film includes applying heat to the compressed separator mixture, thereby adhering the binder particles to each other and to the separator components included in the separator mix (i.e., the ceramic particles and the fibers). In some examples, rollers utilized in compressing the separator mix may be heated, and the two steps may be performed simultaneously. In some examples, dry coating the separator layer onto the active material composite further includes stacking the separator layer onto the second active material layer.

In some examples, the separator layer comprises ceramic particles having an aspect ratio less than or equal to 2:1, such as aluminum oxide (i.e., alumina ($\alpha$-$Al_2O_3$)), corundum, calcined, tabular, synthetic boehmite, silicon oxides or silica, zirconia, and/or the like. The separator layer may further comprise fibers having an aspect ratio greater than or equal to 5:1. The fibers may comprise any suitable fibrous material, such as Nylon, PVdF (polyvinylidene difluoride), Teflon, alumina, Halloysite, and/or the like. In some examples, the fibers comprise Halloysite and accordingly comprise an aluminosilicate clay having a hollow tubular morphology. Halloysite fibers may have a width of approximately 50 nm and a length between 0.5 µm and 1 µm, resulting in an aspect ratio between 10:1 and 20:1. The separator layer may include any suitable blend of ceramic particles and fibers, with a ceramic portion of the separator layer (i.e., portions of the separator layer not including binders) varying in composition from 95% ceramic particles and 5% fibers to 5% ceramic particles and 95% fibers.

Optional step 512 of method 500 includes calendering the composite electrode (e.g., in a hot roll process). The first active material layer, the second active material layer and the separator layer may experience the calendering process as a combined structure (see FIG. 7, above). In some examples, calendering is replaced with another compression, pressing, or compaction process. In some examples, calendering the electrode may be performed by pressing the combined layers against the substrate, such that electrode density is increased in a non-uniform manner, with the first active layer having a first porosity and the separator layer having a lower second porosity. In some examples, calendering the composite electrode binds and/or adheres the dry separator layer to the active material composite by melting binders included in the electrode layers. In some examples, such as when separator powder is directly deposited onto the active material composite, calendering the composite electrode may both form and/or bind the separator powder into a separator layer and bind the separator powder to the active material composite.

F. Illustrative Manufacturing System

Figure 9:
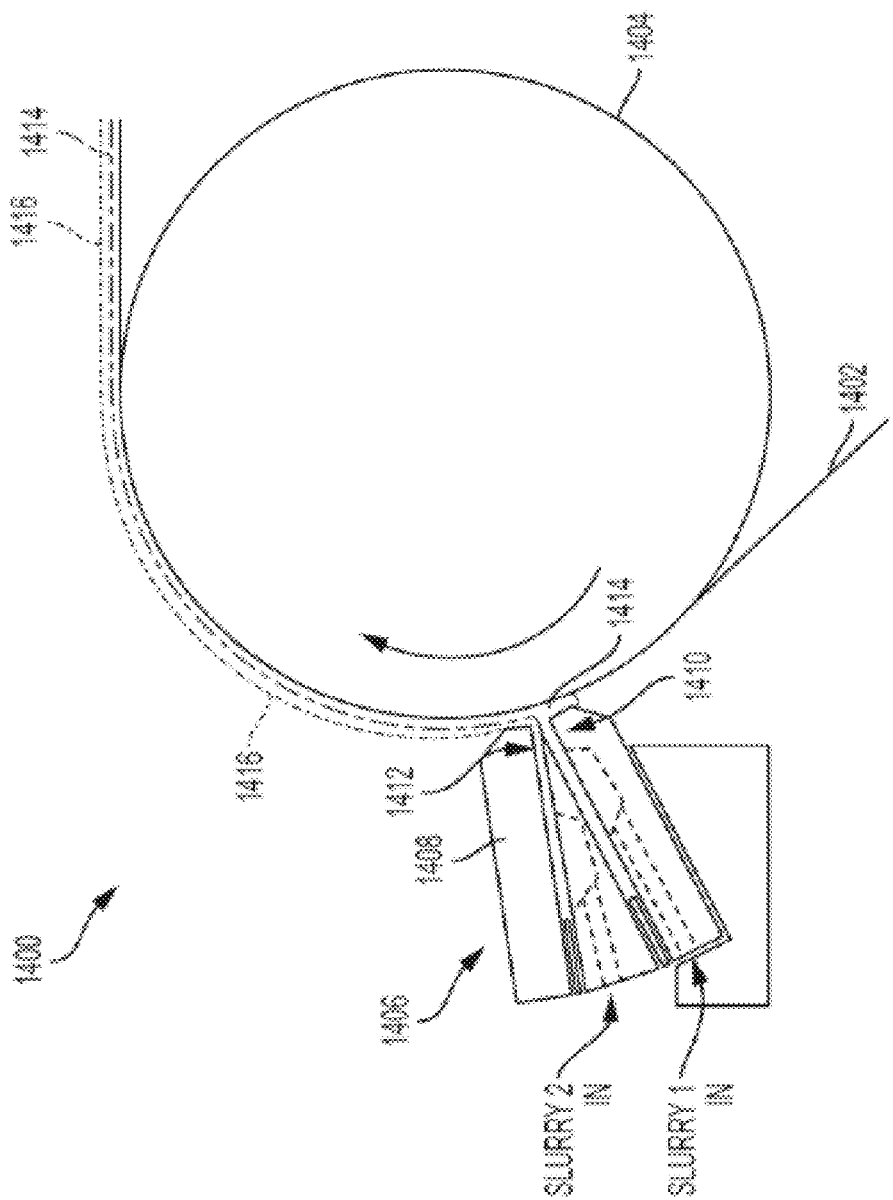
FIG. 9 is a schematic diagram of an illustrative manufacturing system including two die slots suitable for manufacturing electrodes and electrochemical cells of the present disclosure.

Turning to FIG. 9, an illustrative manufacturing system 1400 for use with method 400 will now be described. In some examples, a slot-die coating head with at least two fluid slots, fluid cavities, fluid lines, and fluid pumps may be used to manufacture a battery electrode featuring an active material layer and an integrated separator layer (AKA a separator coating). In some examples, additional cavities may be used to create additional active material layers.

In system 1400, a foil substrate 1402 is transported by a revolving backing roll 1404 past a stationary dispenser device 1406. Dispenser device 1406 may include any suitable dispenser configured to evenly coat one or more layers of slurry onto the substrate. In some examples, the substrate may be held stationary while the dispenser head moves. In some examples, both may be in motion. Dispenser device 1406 may, for example, include a dual chamber slot die coating device having a coating head 1408 with two orifices 1410 and 1412. A slurry delivery system may supply two different slurries to the coating head under pressure. Due to the revolving nature of backing roll 1404, material exiting the lower orifice or slot 1410 will contact substrate 1402 before material exiting the upper orifice or slot 1412. Accordingly, a first layer 1414 will be applied to the substrate and a second layer 1416 will be applied on top of the first layer. In the present disclosure, the first layer 1414 may be the active material of an electrode and the second layer may be a separator layer.

Figure 10:
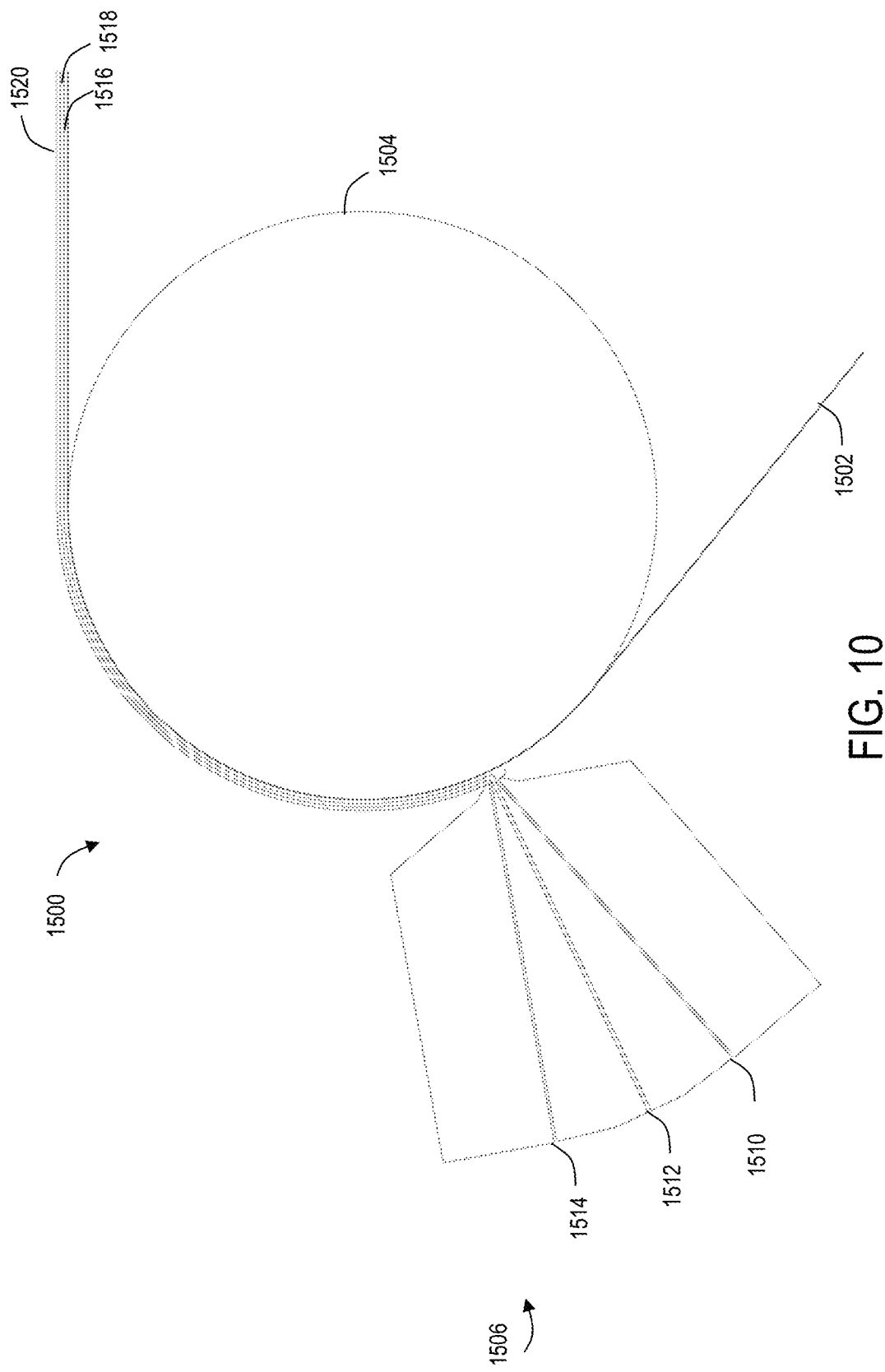
FIG. 10 is a schematic diagram of an illustrative manufacturing system including three die slots suitable for manufacturing electrodes and electrochemical cells of the present disclosure.

Manufacturing method 400 may be performed using a dual-slot configuration, as described in FIG. 9, to simultaneously extrude the electrode material and the separator layer, or a multi-slot configuration with three or more dispensing orifices used to simultaneously extrude a multi-layered electrode with an integrated separator layer, as depicted in FIG. 10.

In some examples, a manufacturing system 1500 may include a tri-slot configuration, such that a first active material layer, a second active material layer, and a separator layer may all be extruded simultaneously. In another example, the separator layer may be applied after the electrode (single layered or multilayered) has first dried.

In manufacturing system 1500, a foil substrate 1502 is transported by a revolving backing roll 1504 past a stationary dispenser device 1506. Dispenser device 1506 may include any suitable dispenser configured to evenly coat one or more layers of slurry onto the substrate. In some examples, the substrate may be held stationary while the dispenser head moves. In some examples, both may be in motion. Dispenser device 1506 may, for example, include a three-chamber slot die coating device having a coating head 1508 with three orifices 1510, 1512, and 1514. A slurry delivery system may supply three different slurries to the coating head under pressure. Due to the revolving nature of backing roll 1504, material exiting the lower orifice or slot 1510 will contact substrate 1502 before material exiting the central orifice or slot 1512. Similarly, material exiting central orifice or slot 1512 will contact material exiting lower orifice or slot 1510 before material exiting upper orifice or slot 1514. Accordingly, a first layer 1516 will be applied to the substrate, a second layer 1518 will be applied on top of the first layer, and a third layer 1520 will be applied on top of the second layer.

In some examples, a first active material layer, a second active material layer, and a separator layer may all be extruded simultaneously. In some examples, an active material layer, a first separator layer, and a second separator layer may all be extruded simultaneously. In some embodiments, subsequent layers may be applied after initial layers have first dried. In some examples, some or all layers are manufactured in a dry (e.g., solventless) process. In some examples, the first and second active material layers are coated wet simultaneously and dried, and a third separator layer is dry coated onto the second active material layer once the first and second active material layers have been dried.

G. Illustrative Combinations and Additional Examples

This section describes additional aspects and features of electrodes having integrated fibrous separators, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An electrode having an integrated fibrous ceramic separator, the electrode comprising:

an active material layer layered onto a current collector substrate, the active material layer comprising a first plurality of active material particles adhered together by a first binder; and an integrated separator layer layered onto and directly contacting the active material layer, the integrated separator layer comprising a plurality of ceramic particles mixed with a plurality of fibers;

wherein the fibers are configured to increase a lateral strength of the separator layer.

A1. The electrode of paragraph A0, further comprising an interlocking region adhering the separator layer to the active material layer, the interlocking region including a non-planar interpenetration of the separator layer and the active material layer such that first fingers of the active material layer composite interlock with second fingers of the separator layer.

A2. The electrode of paragraph A0 or A1, wherein the active material layer comprises a first layer including a plurality of first active material particles, and a second layer including a plurality of second active material particles.

A3. The electrode of any of paragraphs A0 through A2, wherein the ceramic particles have an aspect ratio less than 2:1 and the fibers have an aspect ratio greater than 5:1.

A4. The electrode of any of paragraphs A0 through A3, wherein the ceramic particles comprise alumina.

A5. The electrode of any of paragraphs A0 through A4, wherein the fibers are oriented horizontally.

A6. The electrode of any of paragraphs A0 through A5, wherein the fibers comprise Halloysite.

A7. The electrode of any of paragraphs A0 through A6, wherein the integrated separator layer comprises between 5% and 95% fibers by volume.

A8. The electrode of any of paragraphs A0 through A7, wherein the integrated separator layer comprises between 5% and 95% ceramic particles by volume.

A9. The electrode of any of paragraphs A0 through A8, wherein a mass fraction of the ceramic particles in the separator layer is greater than 50%.

A10. The electrode of paragraph A9, wherein the mass fraction of the ceramic particles in the separator layer is greater than 99%.

A11. The electrode of any of paragraphs A0 through A8, wherein the separator layer further comprises a polymer mixed with the ceramic particles, such that a mass fraction of the ceramic particles in the separator layer is less than 50% and a mass fraction of the polymer is greater than 50%.

A12. The electrode of any of paragraphs A0 through A11, further comprising a layer of polyolefin disposed on the separator layer, such that the separator layer is between the layer of polyolefin and the active material layer.

B0. An electrochemical cell electrode having an integrated separator layer, the electrode comprising:

an electrochemical cell electrode having a current collector substrate coupled to one or more active material layers each comprising a respective plurality of active material particles; and a separator layer in direct contact with an adjacent layer of the one or more active material layers, such that the one or more active material layers are between the separator layer and the current collector substrate, the integrated separator layer including a plurality of ceramic particles mixed with a plurality of fibers;

wherein the fibers are configured to increase a lateral strength of the separator layer.

B1. The electrochemical cell electrode of B0, wherein an interlocking region secures the separator layer to the adjacent active material layer, the interlocking region including a non-planar boundary between the separator layer and the adjacent active material layer, such that the adjacent active material layer and the separator layer are interpenetrated B2. The electrode of B0 or B1, wherein the non-planar boundary comprises a plurality of substantially discrete first fingers of the active material particles interlocked with a plurality of substantially discrete second fingers of the ceramic particles.

B3. The electrode of any of B0 through B2, comprising only a single active material layer extending from the current collector substrate to the separator layer.

B4. The electrode of any one of paragraphs B0 through B3, wherein a mass fraction of the ceramic particles in the separator layer is greater than 50%.

B5. The electrode of B4, wherein the mass fraction of the ceramic particles in the separator layer is greater than 99%.

B6. The electrode of any one of paragraphs B0 through B3, wherein the separator layer further comprises a polymer mixed with the ceramic particles, such that a mass fraction of the ceramic particles in the separator layer is less than 50% and a mass fraction of the polymer is greater than 50%.

B7. The electrode of any one of paragraphs B0 through B6, further comprising a layer of polyolefin disposed on the separator layer, such that the separator layer is between the layer of polyolefin and the one or more active material layers.

B7. The electrode of any one of paragraphs B0 through B6, wherein the plurality of ceramic particles comprise an aluminum oxide.

B8. The electrode of any of paragraphs B0 through B7, wherein the ceramic particles have an aspect ratio less than 2:1 and the fibers have an aspect ratio greater than 5:1.

B9. The electrode of any of paragraphs B0 through B8, wherein the fibers are oriented horizontally.

B10. The electrode of any of paragraphs B0 through B9, wherein the fibers comprise Halloysite.

B11. The electrode of any of paragraphs B0 through B10, wherein the integrated separator layer comprises between 5% and 95% fibers by volume.

B12. The electrode of any of paragraphs B0 through B11, wherein the integrated separator layer comprises between 5% and 95% ceramic particles by volume.

C0. A method of manufacturing an electrode including an integrated fibrous separator, the method comprising:

causing a current collector substrate and an electrode material composite dispenser to move relative to each other; and coating at least a portion of the current collector substrate with an active material composite and a separator material to produce an electrochemical cell electrode, using the dispenser, wherein coating includes:

dispensing one or more active material layers each comprising a slurry of active material composite onto the current collector substrate using one or more respective first orifices of the dispenser; and dispensing a separator layer onto a topmost one of the one or more active material layers while the active material composite is wet, using one or more second orifices of the dispenser, such that the one or more active material layers are between the separator layer and the current collector substrate, the separator layer including a plurality of ceramic particles mixed with a plurality of fibers;

wherein an interpenetrating boundary is formed between the separator layer and the topmost one of the one or more active material layers; and wherein the fibers are configured to increase a lateral strength of the separator layer.

C1. The method of paragraph C0, wherein the interpenetrating boundary is formed by an interlocking region coupling the separator layer to the adjacent topmost one of the one or more active material layers, the interlocking region including an interpenetration such that first fingers of the separator layer interlock with second fingers of the active material composite.

C2. The method of paragraph C0 or C1, further comprising calendering the electrode after the one or more active material layers and the separator layers have dried.

C3. The method of any of paragraphs C0 through C2, wherein the fibers comprise Halloysite.

C4. The method of any of paragraphs C0 through C3, wherein the ceramic particles comprise alumina.

D0. A method of manufacturing an electrode including an integrated fibrous separator, the method comprising:

coating an active material layer of a composite electrode onto a current collector substrate, the active material layer including a plurality of first active material particles;

coating a separator layer onto the active material layer, the separator layer including a plurality of ceramic particles mixed with a plurality of fibers; and forming an interpenetrating boundary layer between the active material layer and the separator layer;

wherein the plurality of fibers are oriented substantially horizontally within the separator layer, such that the fibers enhance a lateral strength of the separator layer.

D1. The method of paragraph D0, wherein the interpenetrating boundary is formed by an interlocking region coupling the separator layer to the active material layer, the interlocking region including an interpenetration such that first fingers of the separator layer interlock with second fingers of the active material composite.

D2. The method of paragraph D0 or D1, further comprising calendering the electrode after the active material layer and the separator layer have dried.

D3. The method of any of paragraphs D0 through D2, wherein the fibers comprise Halloysite.

D4. The method of any of paragraphs D0 through D3, wherein the ceramic particles comprise alumina.

E0. A method of manufacturing an electrode including an integrated fibrous separator, the method comprising:

coating a first active material layer of an electrode composite onto a current collector substrate, the first active material layer including a plurality of first active material particles adhered together by a first binder;

coating a second active material layer onto the first active material layer, the second active material layer including a plurality of second active material particles adhered together by a second binder;

coating a separator layer onto the second active material layer, the separator layer including a plurality of ceramic particles mixed with a plurality of fibers and adhered together by a third binder; and forming an interpenetrating boundary layer between the first active material layer and the second active material layer;

wherein the plurality of fibers are oriented substantially horizontally within the separator layer, such that the fibers enhance a lateral strength of the separator layer.

E1. The method of paragraph E0, wherein coating the separator layer includes electrostatically spraying the ceramic particles and ceramic fibers onto the active material layer.

E2. The method of paragraph E0, wherein coating the separator layer includes:

compressing a separator mix comprising the plurality of ceramic particles, the plurality of fibers, and the third binder to form a separator film; and stacking the separator film onto the second active material layer.

E3. The method of paragraph E2, further comprising heating the separator film.

E4. The method of any of paragraphs E0 through E3, further comprising calendering the electrode, such that the separator layer adheres to the second active material layer.

E5. The method of any of paragraphs E0 through E4, wherein the interpenetrating boundary is formed by an interlocking region coupling the separator layer to the active material layer, the interlocking region including an interpenetration such that first fingers of the first active material layer interlock with second fingers of the second active material layer.

E6. The method of any of paragraphs E0 through E5, wherein the fibers comprise Halloysite.

E7. The method of any of paragraphs E0 through E6, wherein the ceramic particles comprise alumina.

Advantages, Features, and Benefits

The different embodiments and examples of the electrodes including integrated fibrous separators described herein provide several advantages over known separators for electrochemical cells. For example, illustrative embodiments and examples described herein provide enhanced mechanical strength, allowing integrated ceramic separator layers to resist cracking and/or fracturing during coating and processing.

Additionally, and among other benefits, illustrative embodiments and examples described herein provide lateral strength, improving separator longevity during electrode cycling (and associated swelling and contraction).

Additionally, and among other benefits, illustrative embodiments and examples described herein reduce tortuosity of integrated fibrous separators by mixing fibers with ceramic particles.

No known system or device can perform these functions. However, not all embodiments and examples described herein provide the same advantages or the same degree of advantage.

Conclusion

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An electrode comprising:
   an active material layer layered onto a current collector substrate, the active material layer comprising a first plurality of active material particles adhered together by a first binder;
   an integrated separator layer layered onto and directly contacting the active material layer, the integrated separator layer comprising a plurality of ceramic particles mixed with a plurality of fibers, wherein the plurality of fibers are configured to increase a lateral strength of the integrated separator layer, and wherein the plurality of ceramic particles have an aspect ratio less than or equal to 2:1; and
   an interlocking region adhering the integrated separator layer to the active material layer, the interlocking region including a non-planar interpenetration of the integrated separator layer and the active material layer, such that first fingers of the active material layer interlock with second fingers of the integrated separator layer, and wherein the second fingers of the integrated separator layer comprise the plurality of ceramic particles and the plurality of fibers.

2. The electrode of claim 1, wherein the plurality of fibers have an aspect ratio greater than or equal to 5:1.

3. The electrode of claim 1, wherein the plurality of ceramic particles comprise alumina.

4. The electrode of claim 1, wherein the plurality of fibers are oriented horizontally.

5. The electrode of claim 1, wherein the plurality of fibers comprise Halloysite.

6. The electrode of claim 1, wherein the integrated separator layer comprises between 5% and 95% fibers by volume.

7. The electrode of claim 1, wherein the integrated separator layer comprises between 5% and 95% ceramic particles by volume.

8. An electrode comprising:
   a current collector substrate coupled to one or more active material layers, each active material layer of the one or more active material layers comprising a respective plurality of active material particles; and
   an integrated separator layer in direct contact with an adjacent active material layer of the one or more active material layers, such that the one or more active material layers are between the integrated separator layer and the current collector substrate, the integrated separator layer including a plurality of ceramic particles mixed with a plurality of fibers, wherein the plurality of ceramic particles have an aspect ratio less than or equal to 2:1;
   wherein the plurality of fibers are configured to increase a lateral strength of the integrated separator layer; and
   wherein an interlocking region secures the integrated separator layer to the adjacent active material layer, the interlocking region including a non-planar boundary between the integrated separator layer and the adjacent active material layer, such that the adjacent active material layer and the integrated separator layer are interpenetrated, wherein the non-planar boundary comprises a plurality of substantially discrete first fingers comprising the respective plurality of active material particles of the adjacent active material layer interlocked with a plurality of substantially discrete second fingers comprising the plurality of ceramic particles and the plurality of fibers.

9. The electrode of claim 8, further comprising a layer of polyolefin disposed on the integrated separator layer, such that the integrated separator layer is between the layer of polyolefin and the one or more active material layers.

10. The electrode of claim 8, wherein the plurality of ceramic particles comprise an aluminum oxide.

11. The electrode of claim 8, wherein the plurality of fibers have an aspect ratio greater than 5:1.

12. The electrode of claim 8, wherein the plurality of fibers are oriented horizontally.

13. The electrode of claim 8, wherein the plurality of fibers comprise Halloysite.

14. A method of manufacturing an electrode, the method comprising:
   causing a current collector substrate and a dispenser to move relative to each other; and
   coating at least a portion of the current collector substrate with an electrode composite to produce the electrode, using the dispenser, wherein coating includes:
      dispensing one or more active material layers each comprising a slurry of active material composite onto the current collector substrate using one or more respective first orifices of the dispenser; and
      dispensing a separator layer onto a topmost one of the one or more active material layers while the active material composite is wet, using one or more second orifices of the dispenser, such that the one or more active material layers are between the separator layer and the current collector substrate, the separator layer including a plurality of ceramic particles mixed with a plurality of fibers, wherein the plurality of ceramic particles have an aspect ratio less than or equal to 2:1;
   wherein an interpenetrating boundary is formed between the separator layer and the topmost one of the one or more active material layers, wherein the interpenetrating boundary is formed by an interlocking region coupling the separator layer to the topmost one of the one or more active material layers, the interlocking region including an interpenetration such that first fingers of the separator layer interlock with second fingers of the active material composite, wherein the first fingers comprise ceramic particles and fibers; and
   wherein the plurality of fibers are configured to increase a lateral strength of the separator layer.

15. The method of claim 14, further comprising calendering the electrode after the one or more active material layers and the separator layer have dried.

16. The method of claim 14, wherein the plurality of fibers comprise Halloysite.

17. The electrode of claim 1, wherein a mass fraction of the plurality of ceramic particles in the separator layer is greater than 50%.

18. The electrode of claim 8, wherein the integrated separator layer comprises between 5% and 95% fibers by volume.

19. The electrode of claim 8, wherein the integrated separator layer comprises between 5% and 95% ceramic particles by volume.

20. The method of claim 14, wherein the plurality of ceramic particles comprise alumina.

* * * * *